United States Patent [19]
West et al.

[11] Patent Number: 5,689,731
[45] Date of Patent: Nov. 18, 1997

[54] PROGRAMMABLE SERIALIZER USING MULTIPLEXER AND PROGRAMMABLE ADDRESS COUNTER FOR PROVIDING FLEXIBLITY IN SCANNING SEQUENCES AND WIDTH OF DATA

[75] Inventors: Roderick Michael P. West, Colchester; Hiroyuki Ando, Essex Junction; Stephen B. Barrett; Peter Casavant, both of Williston; Edward K. Evans; Daniel Liguori, both of Essex Junction; David Litten, Jericho, all of Vt.

[73] Assignee: International Business Machines Corporation, Armonk, N.Y.

[21] Appl. No.: 475,545

[22] Filed: Jun. 7, 1995

[51] Int. Cl.$^6$ ................................................ G06F 13/00
[52] U.S. Cl. ............. 395/882; 365/189.02; 365/189.12; 365/230.02; 365/230.05; 365/236; 365/239
[58] Field of Search ............................ 395/800, 163, 395/882; 365/230.4, 189.02, 189.12, 230.02, 230.05, 236, 239; 340/825.52; 345/191

[56] References Cited

U.S. PATENT DOCUMENTS

| | | | |
|---|---|---|---|
| 3,806,886 | 4/1974 | McClellan et al. | 340/172.5 |
| 3,959,596 | 5/1976 | Bojanek et al. | 179/15 |
| 5,311,468 | 5/1994 | Anderson | 365/189.02 |
| 5,337,045 | 8/1994 | Shirasaka | 340/825.52 |
| 5,404,564 | 4/1995 | Hiwada et al. | 395/800 |
| 5,430,464 | 7/1995 | Lumelsky | 345/191 |
| 5,453,957 | 9/1995 | Norris et al. | 365/230.4 |
| 5,539,873 | 7/1996 | Yoshimori et al. | 395/163 |

*Primary Examiner*—Thomas C. Lee
*Assistant Examiner*—Le Hien Luu
*Attorney, Agent, or Firm*—Peter W. Peterson; DeLio & Peterson, LLC; Tiffany Townsend

[57] ABSTRACT

A programmable serializer comprising a multi-bit input port, a multi-bit output port, at least one multiplexer and at least one programmable address counter corresponding to the multiplexer for generating a sequence of multiplexer data input addresses that are inputted into the multiplexer address input. The multiplexer has an output connected to the multi-bit output port, an address input and a plurality of data input channels having addresses. Each data input channel is connected to a corresponding bit of the multi-bit input port. At least one data input channel is coupled to the multiplexer output when the corresponding address of the data input channel is applied to the address input. The programmable address counter receives and stores an initial address value, an address increment value and a count value and generates a sequence of addresses based on these values. The initial address value represents the multiplexer data channel that is to be initially coupled to the multiplexer output. The address increment value represents the increment that must be added to a current address in order to reach a next address. The count value represents the number of address that must be generated by the counter prior to restarting the sequence at the initial address value.

5 Claims, 4 Drawing Sheets

| Outputs | Programming Values | | | Data Group Selected by Each Multiplexer (Mux) | | | | | | | | | | | | | | | |
|---|---|---|---|---|---|---|---|---|---|---|---|---|---|---|---|---|---|---|---|
| | Initial Value | Increment Value | Count Value | Pixel | | | | | | | | | | | | | | | |
| | | | | a | b | c | d | e | f | g | h | i | j | k | l | m | n | o | p |
| Mux 3 | - | - | 16 | - | - | - | - | - | - | - | - | - | - | - | - | - | - | - | - |
| Mux 2 | 2 | 3 | 16 | 2 | 5 | 8 | b | e | 1 | 4 | 7 | a | d | 0 | 3 | 6 | 9 | c | f |
| Mux 1 | 1 | 3 | 16 | 1 | 4 | 7 | a | d | 0 | 3 | 6 | 9 | c | f | 2 | 5 | 8 | b | e |
| Mux 0 | 0 | 3 | 16 | 0 | 3 | 6 | 9 | c | f | 2 | 5 | 8 | b | e | 1 | 4 | 7 | a | d |

PROGRAMMABLE SERIALIZER USING MULTIPLEXER AND PROGRAMMABLE ADDRESS COUNTER FOR PROVIDING FLEXIBLITY IN SCANNING SEQUENCES AND WIDTH OF DATA

BACKGROUND OF THE INVENTION

1. Field of the Invention

The present invention pertains to serializers used in computer graphic subsystems.

2. Problem to be Solved

Computer graphic subsystems typically utilize a serializer for increasing the pixel data bandwidth between a Frame Buffer Video Memory and a Palette DAC. Conventional serializers perform the conversion from a first data width (at the first data rate) to a second data width (at the second data rate) using a fixed sequencing scheme. They divide the first data width into a predetermined number of equal parts, each having a fixed and adjacent ordering of data that generally represents a single pixel and a width equal to the desired second data width. Conventional serializers then perform the conversion to the second data width by sequencing through the equal parts from one end of the first data width to the other end of the first data width. This sequencing scheme must be exactly matched to the configuration of the graphics memory. Therefore, the fixed sequencing scheme of a conventional serializer imposes a fixed structure or organization of pixel data within a fixed configuration of the graphics memory.

This problem is especially acute in high-end workstation systems, and is becoming more acute in personal computer systems as their level of function increases. One attempt at solving this problem is to provide a variety of fixed serializer designs, each of which corresponding to a specific fixed graphics memory organization. Such conventional serializers provide a small number of different fixed options that allow certain fixed variations in the number and size of the equal data parts that subdivide the first data width. In general, the applied sequence of said equal data parts and the ordering of data within those equal data parts is never varied. Each option is generally controlled by separate or additional control circuitry. These fixed options are usually kept to a minimum because they add significant circuit area and therefore cost to the device that incorporates such a serializer. In addition, such a configuration generally results in highly complex serializer designs.

Bearing in mind the problems and deficiencies of conventional serializers, it is therefore an object of the present invention to provide a serializer that can support a wide variety of video memory configurations.

It is another object of the present invention to provide a serializer circuit that minimizes the component count.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a serializer comprising a multi-bit data input port adapted for receiving input data, a multi-bit data output port for outputting selected data, and at least one multiplexer having a multiplexer output connected to the output port, an address input, and a plurality of data input channels having addresses. Each of the plurality of data input channels is connected to a corresponding bit of the input port. At least one data input channel is coupled to the multiplexer output when the corresponding address of the data input channel is applied to the address input. The serializer further includes at least one programmable address counter corresponding to the multiplexer for generating a sequence of multiplexer data input addresses for input into the multiplexer address input. The counter includes a storage device for storing an initial address value and an address increment value. The initial address value represents the multiplexer data channel that is to be initially coupled to the multiplexer output: The address increment value represents the increment that must be added to a current multiplexer data channel address so as to produce a next multiplexer data channel address.

In a related aspect, the present invention is directed to a serializer for converting parallel pixel data into serial pixel data, comprising a multi-bit data input port for receiving the parallel pixel data from a video memory, a multi-bit data output port for outputting selected pixel data, and at least one multiplexer having a multiplexer output connected to the output port, an address input, and a plurality of data input channels having addresses. Each of the plurality of data input channels is connected to a corresponding bit of the input port. At least one data input channel is coupled to the multiplexer output when the corresponding address of the data input channel is applied to the address input. The serializer further includes at least one programmable address counter corresponding to the multiplexer for generating a sequence of multiplexer data input addresses for input into the multiplexer address input. The counter includes a storage device for storing an initial address value, an address increment value and a count value. The initial address value represents the multiplexer data channel that is to be initially coupled to the multiplexer output. The address increment value represents the increment that must added to a current multiplexer data channel address so as to produce a next multiplexer data channel address. The current multiplexer data channel address is initially determined by the initial address value. The count value represents the number of multiplexer addresses that must be generated by the counter prior to the counter restarting the sequence at the initial address value. The serializer further includes means for changing the initial address, address increment and count values stored in the storage device of the programmable counter.

In a further aspect, the present invention is directed to a serializer for converting parallel pixel data into serial pixel data comprising a multi-bit data input port for receiving the parallel pixel data from a video memory, the parallel pixel data being defined by groups of bits wherein each pixel is represented by at least one of the group of bits, a multi-bit data output port for outputting selected data from at least one of the groups of bits, and at least one multiplexer having a multiplexer output connected to the output port, an address input, and a plurality of groups of data input channels. Each group of data input channels has an address and is connected to a corresponding group of bits of the input port. One of the groups of data input channels is coupled to the multiplexer output when the corresponding address of the group of data input channels is applied to the address input. The serializer further includes at least one programmable address counter corresponding to the multiplexer for generating a sequence of multiplexer data input addresses for input into the multiplexer address input. The counter includes a storage device for storing an initial address value, an address increment value and a count value. The initial address value represents the group of multiplexer data input channels initially coupled to the multiplexer output. The address increment value represents the increment that must added to a current address so as to produce a next address, the current address initially being determined by the initial address value. The count value represents the number of addresses that must be generated by the counter prior to the counter restarting the sequence at the initial address value. The serializer further includes means for changing the initial address, address increment and count values stored in the storage device of the programmable counter.

BRIEF DESCRIPTION OF THE DRAWINGS

The features of the invention believed to be novel and the elements characteristic of the invention are set forth with particularly in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENTS

In describing the preferred embodiment of the present invention, reference will be made herein to FIGS. 1–4 of the drawings.

A computer graphics system generally comprises a Graphics Controller, Graphics Memory, and a Palette DAC. (The Palette DAC is sometimes referred to by such names as "RAMDAC" or as "LUT-DAC" or incorrectly as simply "DAC".) The computer graphics system is connected to the rest of the computer system over the System Bus. The Graphics Controller provides the interface of the computer graphics system to the System Bus. The Graphics Memory is loaded with graphics data supplied by or via the Graphics Controller. The graphics data stored in the Graphics Memory is provided to the Palette DAC, which processes and converts that graphics data, providing the results of that processing and conversion to the Display Device for presentation as a visual image.

The input to the Palette DAC typically comprises a serializer, which receives graphics data serially from the Graphics Memory. That data is typically several pixels wide and provided at a frequency that is some fraction of the display pixel frequency. The output of the serializer is typically one (1) pixel wide at full pixel frequency. (That pixel frequency may be as high as 250 MHz and, in some special cases, much higher than that.) The output of the serializer is continuous and provided in synchronism with, and to satisfy the real time data needs of the Display Device.

Figure 1:
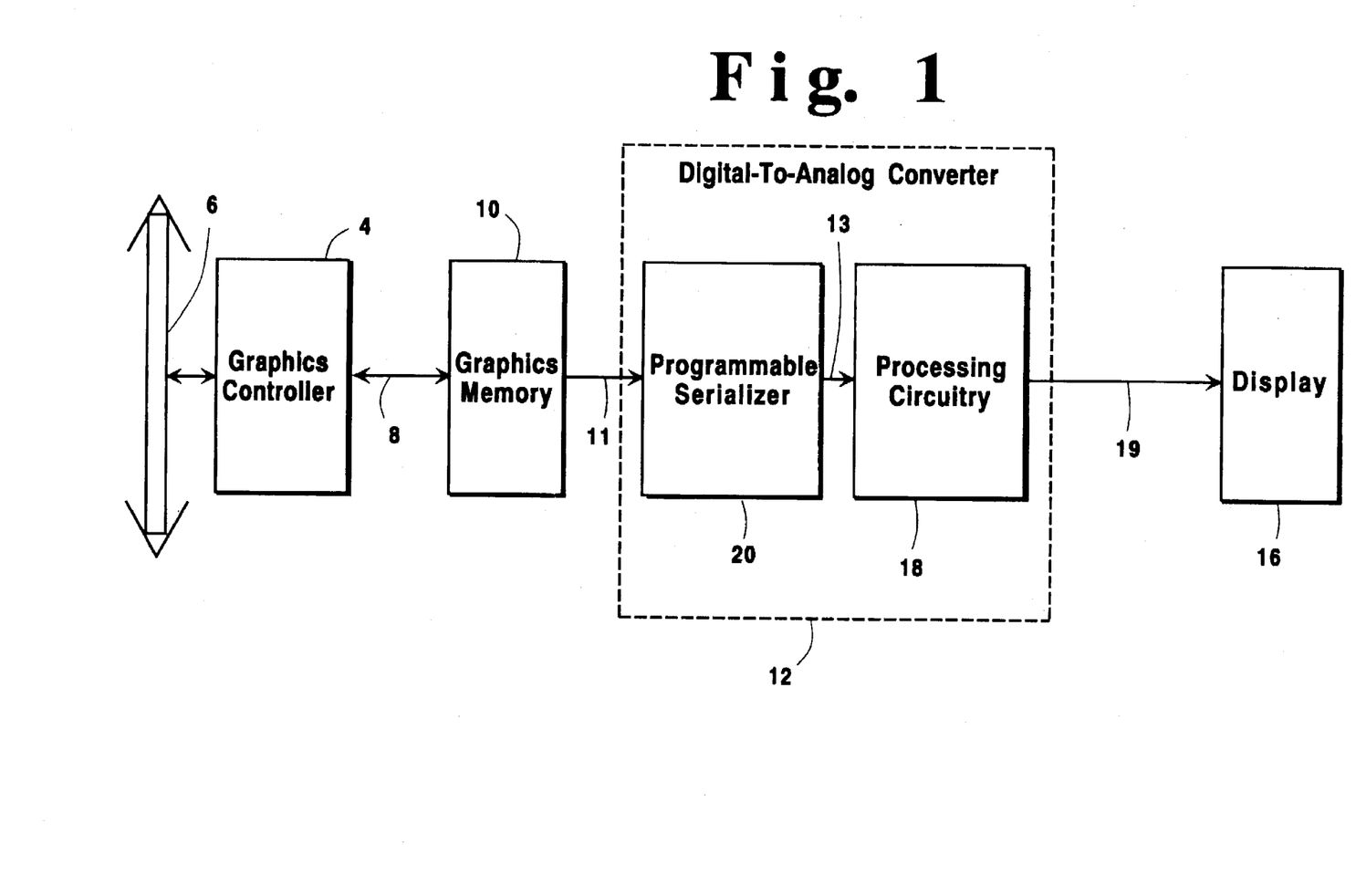
FIG. 1 is a block diagram of a graphics subsystem that utilizes the serializer of the present invention.

FIG. 1 shows a computer graphics system which comprises a graphics controller 4, graphics memory 10, and a Palette DAC (digital-to-analog-converter) device 12. The computer graphics system is connected to the rest of the computer system over the system bus 6. The graphics controller 4 provides the interface of the computer graphics system to the System Bus 6 and is also connected to graphics memory 10 by bus 8. The graphics memory 10 is loaded with graphics data supplied by or via the graphics controller 4 and outputs that graphics data to Palette DAC 12 over bus 11. The Palette DAC 12 processes and converts that graphics data, providing, over bus 19, the results of that processing and conversion to display device 16 for presentation as a visual image.

Palette DAC 12 basically comprises pixel format and color processing circuitry 18 and programmable serializer 20 of the present invention. Serializer 20 transforms or converts parallel pixel data 11, received from memory 10, into serial pixel data 13. Serial pixel data 13 is then formatted, color processed, and converted into analog information by processing circuitry 18. Processing circuitry 18 then outputs the analog information 19 to display 16.

Figure 2:
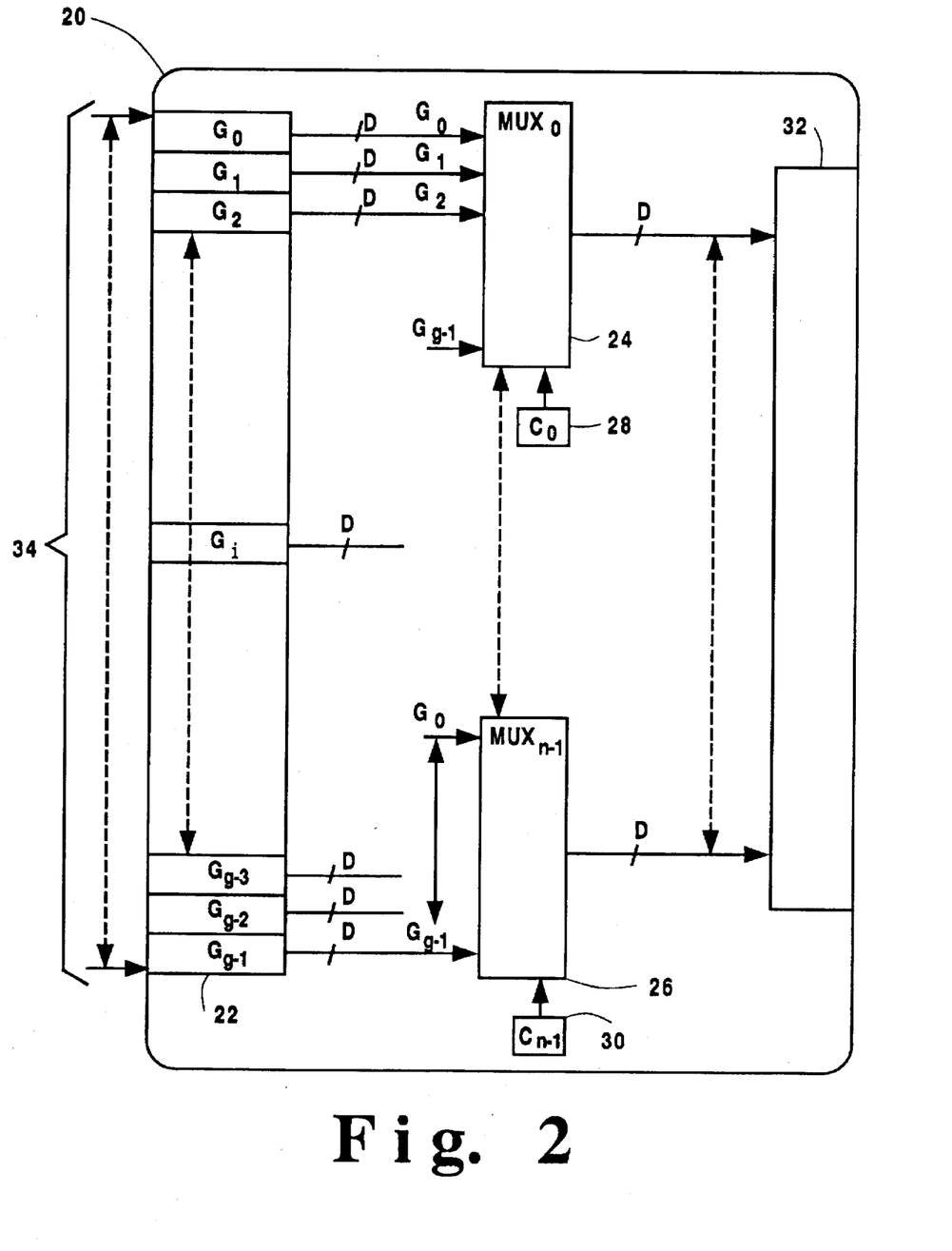
FIG. 2 is a block diagram of the serializer of FIG. 1.

Referring to FIG. 2, programmable serializer 20 of the present invention generally comprises a multi-bit pixel data input port 22, first multiplexer 24 and last multiplexer 26, first programmable counter 28 and last programmable counter 30, and multi-bit pixel data output port 32. Each multiplexer has a multi-bit output channel connected to the multi-bit pixel data output port 32, an address input connected to an associated programmable counter, and a plurality of multi-bit data input channels connected to the multi-bit pixel input data port 22.

The multi-bit pixel data input port 22 receives the incoming parallel data 34 having a width of W bits that is divided into g multi-bit groups (designated $G_O$ to $G_{g-1}$). Each of the g multi-bit groups consists of D bits, therefore W=g*D. Each of the g multi-bit groups is connected to a corresponding one of the g multi-bit data input channels on each of the n multiplexers (designated $MUX_O$ to $MUX_{n-1}$). Each of the g multi-bit data input channels of each multiplexer has a corresponding address, i.e. group $G_i$ of the incoming parallel data 34 is connected to multiplexer data input channels having a corresponding address i on each multiplexer. The address input of each of the n multiplexers is driven by a corresponding programmable address counter.

In FIG. 2, first multiplexer 24 is associated with first programmable address counter 28 (designated $C_O$) and last multiplexer 26 is associated with last programmable address counter 30 (designated $C_{n-1}$). When an address is applied to the address input of any multiplexer, one of the g multi-bit data input channels is coupled to the output of that multiplexer and therefore connected to the multi-bit pixel data output port 32. For instance, if address i is applied by first programmable address counter 28 to the address input of first multiplexer 24, then group $G_i$ of the multi-bit pixel data input port 22 is coupled to the multi-bit pixel data output port 32 via $MUX_O$. The output of each multiplexer, generally, has a width of D bits, and, therefore, since there are n multiplexers, the multi-bit pixel data output port 32 has a width of w=n*D bits.

Each multiplexer also has an-input for receiving a control signal (not shown) that enables or disables that multiplexer. The control signal to each multiplexer is preferably provided from a storage device that is programmable and whose contents may be loaded, erased, or changed by device set-up software, or alternatively, through device driver or application software. If one or more multiplexers are disabled then the effective width (w') of the multi-bit pixel data output port 32 is reduced accordingly.

Each programmable address counter includes a storage device for storing an initial address value, an address increment value, and a count value. Each such storage device is programmable and its contents may be loaded, erased, or changed by device set-up software, or alternatively, through device driver or application software. Each programmable address counter also includes a register or storage device to hold a current multiplexer address value.

The initial address value represents the address of the multi-bit input channel to be initially coupled to the multiplexer output. Initially, the current multiplexer address value is equal to the initial address value. The address increment value represents the increment that is added to a current multiplexer address value so as to produce a next multiplexer address value. The address increment value may, alternatively, be negative, representing a required decrement or subtraction from the current multiplexer address value. After the address increment value has been added, the next multiplexer address value becomes the new current multiplexer address value. Each programmable address counter generates a sequence of multiplexer address values for input into the associated multiplexer address input. The count value determines when the sequence of addresses outputted by the counter restarts at the initial address value. Thus, the count value determines the length of the multiplexer address sequence and the number of multiplexer address values generated before the sequence restarts.

The multiplexer address value has a valid range defined by the number of multi-bit data input channels connected to the multiplexer. Alternatively, the valid range of multiplexer address values for each programmable address counter can be made programmable by extending the storage device included in each programmable counter. If, as a result of the repeated application of increments, the generated next multiplexer address value would fall outside the valid range, then the programmable address counter converts it to a new current multiplexer value within the valid range. For instance, if the valid range of multiplexer addresses covers 16 values from $00_{HEX}$ to $0F_{HEX}$ ($15_{decimal}$) and the current multiplexer address value is $0E_{HEX}$ ($14_{decimal}$) and the increment value is $03_{HEX}$, then the next multiplexer address value would be $11_{HEX}$ ($17_{decimal}$) which is outside the valid range. The programmable address counter converts this to a new current multiplexer address value of $01_{HEX}$, before applying it to the address inputs of its associated multiplexer.

The programmable serializer 20 of the present invention also utilizes a system clock that generates clock pulses that are inputted into the multiplexers and the programmable counters. The system clock provides the timing for the generation of the sequences of addresses produced by the programmable counters. Thus, the rate at which addresses are produced by the programmable counters is determined by the system clock, which is, generally, in synchronism with, and at the same rate as the pixel clock. The incoming parallel data 34 is loaded into the multi-bit pixel data input port 22 in synchronism with this system clock at a rate that is, generally, some predetermined fraction of the system clock rate. The data from the outputs of the multiplexers is loaded into the multi-bit pixel data output port 32 in synchronism with this system clock at a rate that is, generally, equal to the system clock rate. The width of the incoming parallel data 34 and the rate at which it is loaded into the multi-bit pixel data input port 22 represent the first data width and the first data rate. The width of the multi-bit pixel data output port 32 and the rate at which it is loaded from the outputs of the multiplexers represent the second data width and the second data rate. The sequence in which data is coupled from the multi-bit pixel data input port 22 to the multi-bit pixel data output port 32 is determined by the programming applied to the programmable address counters. Thus, the programmable serializer 20 of the present invention performs a conversion from a first data width at a first data rate to a second data width at a second data rate using a programmable sequencing scheme.

The parameters, defining the width (W) of the incoming parallel data 34 and the multi-bit pixel data input port 22, the number (g) of multi-bit groups, the number (D) of bits in each multi-bit group, and the number (n) of multiplexers, the width (w) of the multi-bit pixel data output port 32 determine the maximum operating capabilities of the programmable serializer 20 of the present invention. Within those capabilities, the requirements of the graphics system are accommodated by setting up the programmable values of the programmable counters (initial addresses, address increments, count values, valid multiplexer address ranges) to match the size of graphics memory and the organization of pixel data within the graphics memory.

In general, the width (w=n*D) of the multi-bit pixel data output port 32 represents the maximum size of a single pixel processed by the programmable serializer 20 of the present invention. In general, the multi-bit pixel data output port 32 is used to output a single pixel; however, it will be apparent to those skilled in the art that using the multi-bit pixel data output port 32 to output more or less than one (1) pixel or even multiple smaller pixels could find beneficial application in some circumstances. If less than the full width of the multi-bit pixel data output port 32 is required, then one or more multiplexers can be disabled so that the effective width (w') of the multi-bit pixel data output port 32 is reduced accordingly.

In general, the width (W=g*D) of the multi-bit pixel data input port 22 represents the maximum size of the incoming parallel data 34 that can be processed by the programmable serializer 20 of the present invention. If less than the full width of the multi-bit pixel data input port 22 is required, then the effective width (W') of the multi-bit pixel data input port 32 and the effective number (g') of multi-bit groups can be reduced by setting up the programmable values of the programmable counters (initial addresses, address increments, count values, valid multiplexer address ranges) accordingly. In general, the width of the multi-bit pixel data input port 22 is greater than the width of the multi-bit pixel data output port 32, therefore g*D is generally greater than n*D, and so the number (g) of multi-bit groups is generally greater than the number (n) of multiplexers with a data channel width of D bits.

In general, a pixel is made up of p multi-bit groups of D bits each, where p is one or more. In general, p is less than g and less than or equal to n. The maximum number of pixels that can be presented in the incoming parallel data 34, and loaded into the multi-bit pixel data input port 22, is g/p. The maximum number of pixels that can be presented at the multi-bit pixel data output port 32 is n/p. In general, the multi-bit pixel data output port 32 is used to output a single pixel, so its effective width is w'=p*D, which is less than its full width w=n*D if p is less than n. In this case, if p is less than n, then one or more (n-p) multiplexers are disabled, leaving p multiplexers enabled. If n is equal to p, then the effective width (w'=p*D) of the multi-bit pixel data output port 32 is equal to its full width (w=n*D), and all of the n multiplexers are enabled. If the number of pixels presented in the incoming parallel data 34, and loaded into the multi-bit pixel data input port 22, is m, then m must be less than or equal to g/p. If m is equal to g/p, then the effective width (W'=m*p*D) is equal to the full width (W=g*D) of the multi-bit pixel data input port 22, and the effective number (g'=m*p) of multi-bit groups is equal to the full number (g) of multi-bit groups. If m is less than g/p, then the effective width (W=m*p*D) of the multi-bit pixel data input port 22 is reduced from its full width (W=g*D), and the effective number (g'=m*p) of multi-bit groups is less than the full number (g) of multi-bit groups. In this case, if m is less than g/p, then programmable counters that drive the address inputs of the multiplexers must be programmed accordingly, to avoid any unused groups and to accommodate the reduced effective width (W') of the multi-bit pixel data input port 22.

The ratio of the effective width (W') of the multi-bit pixel data input port 22 to the effective width (w') of the multi-bit pixel data output port 32, W'/w', is the so-called "Multiplex Ratio" of the programmable serializer 20 of the present invention. This "Multiplex Ratio", generally, determines the frequency ratio of the system clock to the clock that loads the incoming parallel data 34 into the multi-bit pixel data input port 22. With a single pixel output at the multi-bit pixel data output port 32, the "Multiplex Ratio" equals (m*p*D)/(p*D), which is equal to m.

The ordering of the pixel data within the incoming parallel data 34 and the required sequence in which data must be coupled from the multi-bit pixel data input port 22 to the multi-bit pixel data output port 32 is accommodated and determined by the sequences of addresses applied to the multiplexers, in response to the programming applied to the programmable address counters. Each multiplexer, in response to its associated programmable address counter, is able to start at an independently given initial address and to step through an independent sequence of addresses based on an independently given address increment value and an independently given count value, within an independently given valid address range. Thus, the requirements of the graphics system are accommodated by programming the values of the programmable counters (initial addresses, address increments, count values, valid multiplexer address ranges) to match the size of graphics memory and the organization of pixel data within the graphics memory.

While the programmable serializer 20 of the present invention has been described above, with reference to FIG. 2, in terms of a highly symmetrical structure, it will be apparent to those skilled in the art that a number of alternatives, modifications and variations are possible. A number of asymmetrical structures can be derived from the symmetrical structure above, and in some circumstances, apparent to those skilled in the art, such structures would be of value. In the description above, all the multi-bit groups are connected to all the multiplexers; however, in some circumstances, it may be appropriate to connect a subset or subsets of the multi-bit groups to some or all of the multiplexers. In the description above, all the multiplexers and their associated programmable counters are run at the same clock rate; however, in some circumstances, it may be appropriate to have some or all of the multiplexers and their associated programmable counters run at different, but synchronized, clock rates. In the description above, all the multiplexers have the same data channel width (D); however, in some circumstances, it may be appropriate to have some multiplexers that have different data channel widths, either higher or lower than D bits wide. In the description above, a single grouping structure has been applied to the incoming parallel data 34 and all the resulting multi-bit groups are connected to all multiplexers with the same ordering; however, in some circumstances, it may be appropriate for some or all of the multiplexers to use a different grouping structure and ordering. None of the above is intended to provide an exhaustive list of all the possible variations, but merely to illustrate that such variations are possible and to exemplify the nature of some of possible forms that the variations may take.

Figure 3:
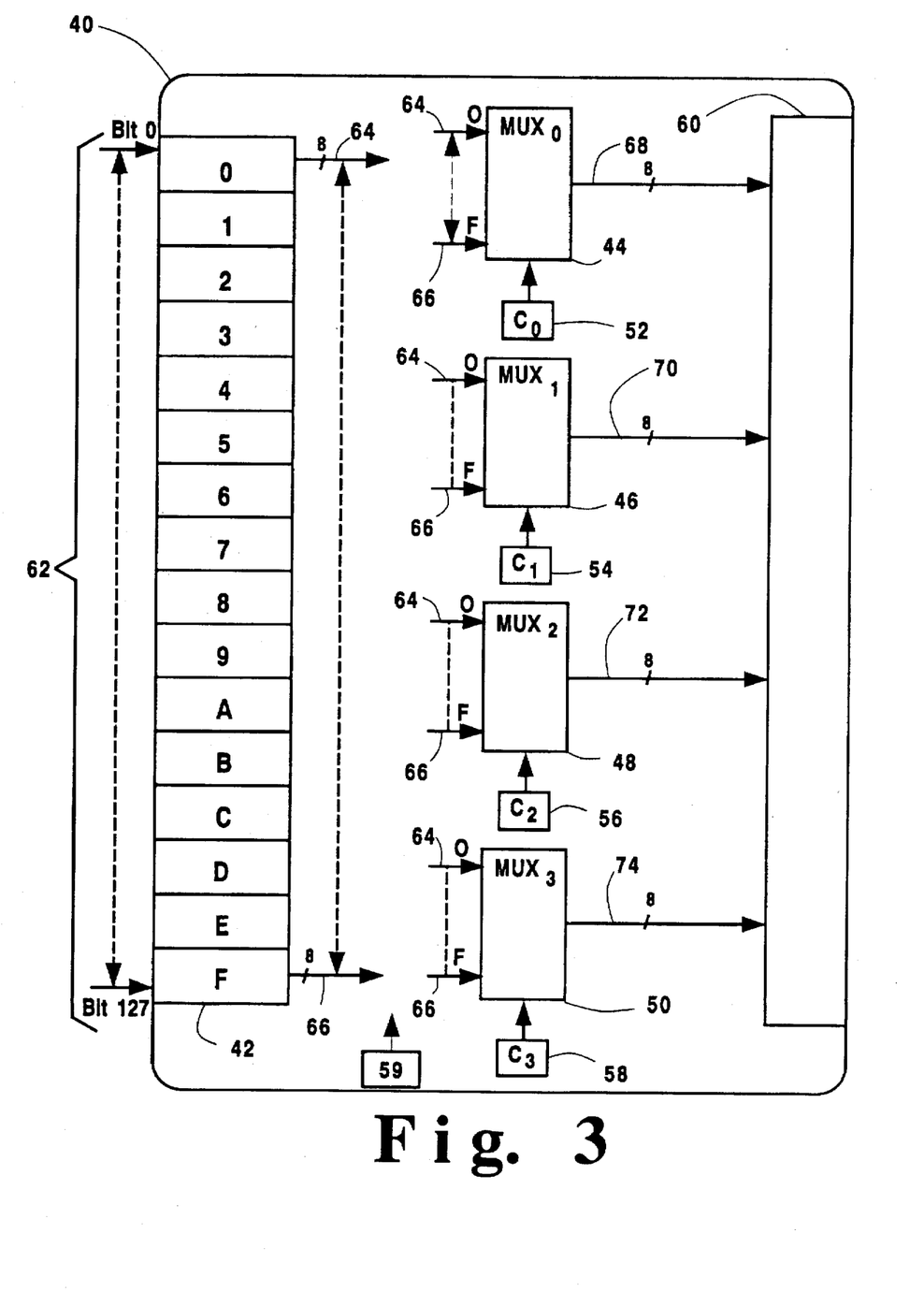
FIG. 3 is a block diagram of one embodiment of the serializer of FIG. 2.

FIG. 3 shows a block diagram of one embodiment of the serializer of the present invention. Serializer 40 generally comprises input pixel data port 42, multiplexers 44, 46, 48 and 50, programmable address counters 52, 54, 56 and 58, system clock 59 and output pixel data port 60. Serializer 40 receives up to 128 bits of pixel data (designated by numeral 62) at input pixel data port 42 wherein Bit 0 is the least significant bit (LSB) and Bit 127 is the most significant bit (MSB). The 128 bits comprising pixel data 62 is separated into sixteen (16) groups of eight (8) bits at the input pixel data port 42. The groups are designated by hexadecimal numbers 0-F shown on input port 42. Each of the sixteen (16) groups of eight (8) data bits is connected to a corresponding group of input data channels of each multiplexer (each group consisting of eight (8) input data channels).

An example of the programming of the serializer, of the present invention embodied by FIG. 3, is illustrated by Tables 1 and 1A. Table 1A shows that the full 128 bits of the pixel data 62 is used for four (4) pixels (a,b,c,d), each consisting of 32 bits in four (4) consecutive groups of eight (8) bits each. This pixel data requires 4:1 serialization (the "Multiplex Ratio" is 4). The required pixel sequence is a,b,c,d. Table 1A shows the groups, identified by hexadecimal numbers 0-F, and the assignment and ordering of the pixel data across those groups. For instance, the first pixel a is represented by four (4) groups, designated $a^0, a^1, a^2, a^3$ and assigned to groups 0,1,2,3 respectively. Table 1 illustrates the use of Initial Address and Increment Values to effect 4:1 serialization. The address increment value and the count value for each programmable counter is set to four (4). Thus, the address outputted by each programmable counter is incremented by four (4) to reach the next address in the sequence. As shown in Table 1, each multiplexer corresponds to a specific order of pixel data sets. For example, multiplexer 44 ($MUX_O$) sequentially selects from four (4) groups of the lowest order of pixel data sets, i.e. $a^0$, $b^0$, $c^0$ and $d^0$. Thus, the programmable counter 52 is programmed to output an initial multiplexer data channel address that will enable multiplexer 44 to couple data 64 (which represents bit group 0, the least significant bit set of pixel a: $a^0$) to the multiplexer output which is connected to output port 60. The multiplexer output data 68 (the selected pixel data set: bit group 0) is coupled to output port 60. During the next clock pulse, the current address generated by counter 52 is then incremented by the address increment value, which is four (4), to produce a multiplexer data input channel address corresponding to bit group four (4) which is the least significant bit set of pixel b: $b^0$. Multiplexer 44 then couples bit group four (4) to the multiplexer output. The multiplexer output data 68 (the selected pixel data set: bit group 4) is coupled to output port 60.

Multiplexer 46, $MUX_1$, cooperates with counter 54 to select bit groups from the next order of pixel data sets, i.e. $a^1$, $b^1$, $c^1$ and $d^1$, in the same manner as multiplexer 44 and counter 52. Similarly, multiplexers 48 and 50 cooperate with counters 56 and 58, respectively, to select bit groups from pixel data sets $a^2$, $b^2$, $c^2$, $d^2$ and $a^3$, $b^3$, $c^3$, $d^3$, respectively, in the same manner as described above. Thus, serializer 40 effects 4:1 serialization whereby the 128 bit parallel input (represented by reference numeral 62) is converted into 32 bit serial pixel data (32 bpp or 32 bits-per-pixel).

TABLE 1

| | Outputs | | | | | |
|---|---|---|---|---|---|---|
| | Programming Values | | | Data Groups Selected by Each Multiplexer (Mux) | | |
| Outputs | Initial Value | Increment Value | Count Value | Pixel a | Pixel b | Pixel c | Pixel d |
| Mux 3 (50) | 3 | 4 | 4 | 3 | 7 | B | F |
| Mux 2 (48) | 2 | 4 | 4 | 2 | 6 | A | E |
| Mux 1 (46) | 1 | 4 | 4 | 1 | 5 | 9 | D |
| Mux 0 (44) | 0 | 4 | 4 | 0 | 4 | 8 | C |

Table 1A illustrates the assignment of pixel notation to ports 0-F.

TABLE 1A

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| $d_3$ | $d_2$ | $d_1$ | $d_0$ | $c_3$ | $c_2$ | $c_1$ | $c_0$ | $b_3$ | $b_2$ | $b_1$ | $b_0$ | $a_3$ | $a_2$ | $a_1$ | $a_0$ |

Another example of the programming of the serializer, of the present invention embodied by FIG. 3, is illustrated by Tables 2 and 3. In this example, the input pixel data port of the serializer of the present invention is configured to receive 120 bits representing five (5) pixels, a, b, c, d and e each of which having three (3) contiguous bytes of pixel data. Thus, the 120 bit input data is divided into fifteen (15) groups 0-E (hexadecimal). Each group contains eight (8) bits. Since there are just three (3) bytes of pixel data (or three (3) sets of pixel data) for each pixel, only three (3) multiplexers are utilized. Multiplexer 50 is disabled by a control signal generated by the software algorithm used to program the serializer. As described above for the embodiment shown in FIG. 3, each multiplexer is associated with a specific order of pixel data groups or sets. For example, $MUX_O$ corresponds to the least significant data groups or sets of pixels a, b, c, d and e, i.e. $a^0$, $b^0$, $c^0$, $d^O$ and $e^0$ which correspond to groups 0, 3, 6, 9 and C, respectively.

Table 2 shows the groups identified by hexadecimal numbers. Since each multiplexer will eventually select all five (5) of its corresponding data groups, the count value is set at five (5) so as to enable the counters to reset the current address to the initial address value after five (5) addresses are generated in order to repeat the sequence of five (5) multiplexer data input channel addresses. As described above for the embodiment of FIG. 3, each generated sequence of data input channel addresses produced by each programmable address counter is based on the initial address and address increment values (shown under "Programming Values" in Table 3) that are programmed into each address counter. The serializer configuration shown in Tables 2 and 3 effects a 5:1 serialization (5:1 multiplexer mode) and converts a 120 bit parallel input into a 24 bit serial output or 24 bits per pixel.

TABLE 2

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| — | e2 | e1 | e0 | d2 | d1 | d0 | c2 | c1 | c0 | b2 | b1 | b0 | a2 | a1 | a0 |

TABLE 3

| | Outputs | | | | | | |
|---|---|---|---|---|---|---|---|
| | Programming Values | | | Data Groups Selected by Each Multiplexer (Mux) | | | | |
| Outputs | Initial Value | Increment Value | Count Value | Pixel a | Pixel b | Pixel c | Pixel d | Pixel e |
| Mux 3 | — | — | 5 | — | — | — | — | — |
| Mux 2 | 2 | 3 | 5 | 2 | 5 | 8 | B | E |
| Mux 1 | 1 | 3 | 5 | 1 | 4 | 7 | A | D |
| Mux 0 | 0 | 3 | 5 | 0 | 3 | 6 | 9 | C |

The serialization configuration represented by Tables 4 and 5 also effects 4:1 serialization wherein a 128 bit parallel input is converted into a 32 bit serial output or 32 bits per pixel. However, as shown in Table 4, the pixel data groups for each pixel are not contiguous but are fragmented (data fragmentation). Such fragmentation may be the result of a video memory organization wherein frame buffer data is not physically stored adjacent to overlay display window data or window identification (WID) data. The serializer must be programmed according to the Programming Values, Initial Value (the initial address value) and the Increment Value (the address increment value) shown in Table 5. The count value is set to four (4) since there are four (4) pixels a, b, c, and d. For example, if $MUX_2$ (referring to Table 5) is to sequentially select the pixel data groups 8, 9, A, and B which represent pixel data sets $a^2$, $b^2$, $c^2$, and $d^2$, respectively, then the initial address value is set to eight (8) to allow $MUX_2$ to start at data group 8 which represents the third byte ($a^2$) of data for pixel a. The programmable address counter increments the current input data channel address by one (1) so as to produce the address that corresponds to bit group 9 which represents the third byte ($b^2$) of data for pixel b. After the multiplexer selects the third byte ($d^2$) of data for pixel d, the count value causes the counter to reset to the initial address value that corresponds to bit group 8. The counter then repeats the sequence of data input addresses so as to enable the multiplexers to select new data for output to the data output port.

TABLE 4

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| d3 | c3 | b3 | a3 | d2 | c2 | b2 | a2 | d1 | d0 | c1 | c0 | b1 | b0 | a1 | a0 |

TABLE 5

| | Outputs | | | | | | |
|---|---|---|---|---|---|---|---|
| | Programming Values | | | Data Groups Selected by Each Multiplexer (Mux) | | | |
| Outputs | Initial Value | Increment Value | Count Value | Pixel a | Pixel b | Pixel c | Pixel d |
| Mux 3 | C | 1 | 4 | C | D | F | F |
| Mux 2 | 8 | 1 | 4 | 8 | 9 | A | B |
| Mux 1 | 1 | 2 | 4 | 1 | 3 | 5 | 7 |
| Mux 0 | 0 | 2 | 4 | 0 | 2 | 4 | 6 |

Figure 4:
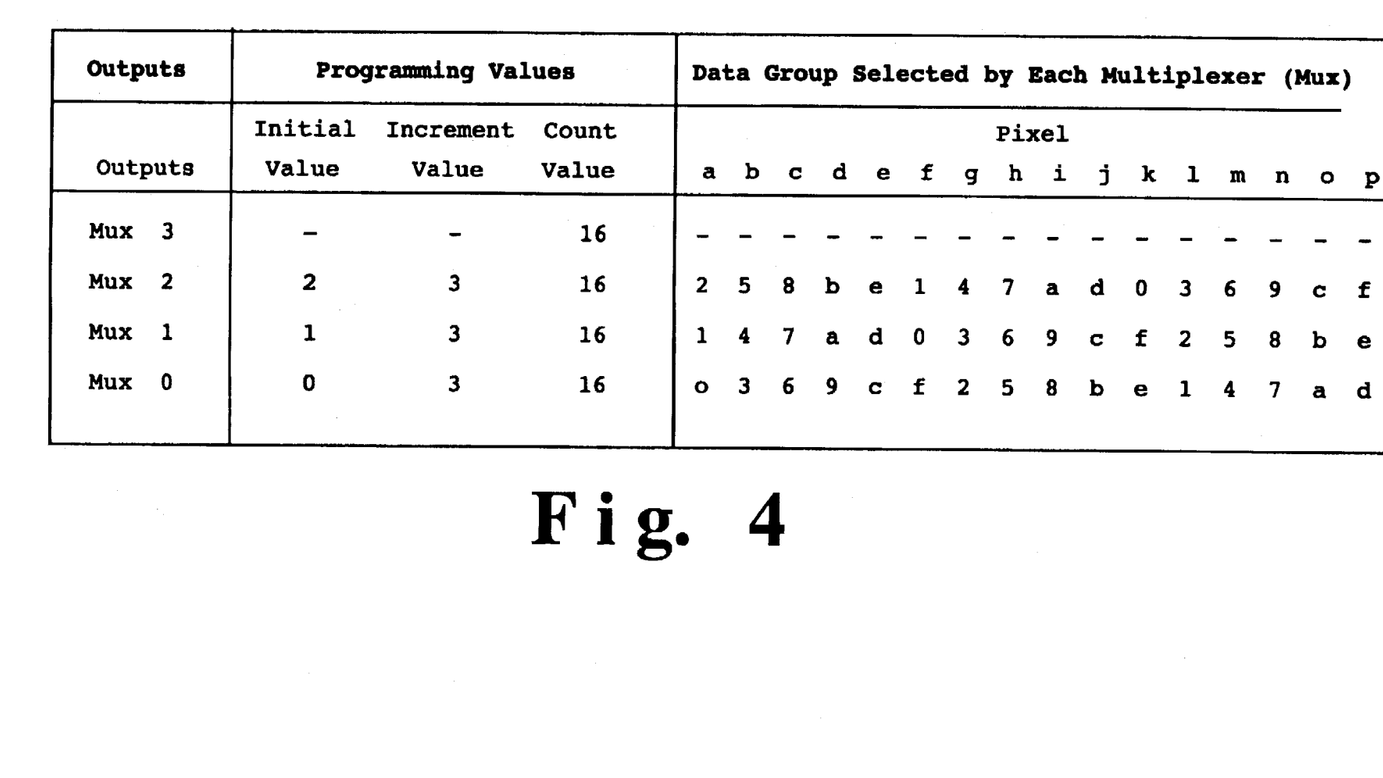
FIG. 4 is a table illustrating one serialization configuration of the present

Another example of the programming of the serializer of the present invention embodied by FIG. 3, is illustrated by Tables 6A-C and the table shown in FIG. 4. In this example, the serializer of the present invention may be utilized with a video memory organization requiring multiple data transfers. Referring to Tables 6A-C, sixteen (16) 24-bit pixels a–p are provided to the input port of the serializer in three (3) separate data transfers. Some pixels span data transfers, e.g. pixels f and k. Since sixteen (16) pixels are present, the address counters are programmed with a count value of 16. Each current address generated by each counter is incremented by three (3) in order to produce the next data input channel address. The counters are programmed to have the initial address values shown in the table of FIG. 4. Thus, each multiplexer will sequentially select sixteen (16) groups or bytes of pixel data prior to restarting the sequence at the initial address value programmed into the corresponding counters. The programming values shown in the table in FIG. 4 effect 16:3 serialization for each data transfer, i.e. 128 bits parallel input converted to 24 bpp serial output.

TABLE 6A

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| f0 | e2 | e1 | e0 | d2 | d1 | d0 | c2 | c1 | c0 | b2 | b1 | b0 | a2 | a1 | a0 |

TABLE 6B

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| k1 | k0 | j2 | j1 | j0 | i2 | i1 | i0 | h2 | h1 | h0 | g2 | g1 | g0 | f2 | f1 |

TABLE 6C

| F | E | D | C | B | A | 9 | 8 | 7 | 6 | 5 | 4 | 3 | 2 | 1 | 0 |
|---|---|---|---|---|---|---|---|---|---|---|---|---|---|---|---|
| p2 | p1 | p0 | o2 | o1 | o0 | n2 | n1 | n0 | m2 | m1 | m0 | l2 | l1 | l0 | k2 |

Thus, the serializer of the present invention is programmable as a function of pixel-width and the parallel input width required at the serializer input pixel data port. It will be apparent to those skilled that this feature allows the serializer to be used with a very large variety of video-buffer memory organizations. The programmable feature also eliminates the need to use multi-serializer circuits, as discussed above, and thus reduces the component count and the associated manufacturing costs of serializer circuits and of the graphic subsystems that utilize the serializer circuits. The serializer of the present invention can also be used with Palette-DACs that support multiple input ports.

The programmable serializer of the present invention provides flexibility that allows it to be utilized with current and future designs of graphics systems. Since the serializer of the present invention can be dynamically reconfigured with software, one (1) serializer design can execute multiple functions. Additionally, the programmable features of the serializer of the present invention allow the serializer to be used with many different products and architectures.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A serializer, comprising:

a multi-bit data input port adapted for receiving input data;

a multi-bit data output port for outputting selected data;

at least one multiplexer having a multiplexer output connected to said output port, an address input, and a plurality of data input channels having addresses, each of the plurality of data input channels being connected to a corresponding bit of said input port, at least one data input channel being coupled to the multiplexer output when the corresponding address of the at least one data input channel is applied to the address input; and at least one programmable address counter corresponding to said at least one multiplexer for generating a sequence of multiplexer data input addresses for input into said multiplexer address input, said counter including a storage device for storing an initial address value and an address increment value, said initial address value representing the multiplexer data channel that is to be initially coupled to the multiplexer output, said address increment value representing the increment that must be added to a current multiplexer data channel address so as to produce a next multiplexer data channel address, said storage device of said at least one programmable address counter storing a count value representing the number of multiplexer addresses that must be generated by said at least one programmable counter prior to said counter restarting the sequence at said initial address value.

2. The serializer according to claim 1 wherein said at least one counter and at least one multiplexer further include system clock inputs, said serializer further including a system clock, said system clock being adapted to repeatedly generate a sequence of clock pulses for input into said system clock inputs of said at least one counter and said at least one multiplexer, said multiplexer, upon receiving a clock pulse, coupling said at least one data input channel to the multiplexer output wherein said at least one data input channel has an address generated by said programmable address counter.

3. The serializer according to claim 1 further including means for changing the initial address and address increment values stored in said storage device of said programmable counter.

4. A serializer for converting parallel pixel data into serial pixel data, comprising:

a multi-bit data input port for receiving the parallel pixel data from a video memory;

a multi-bit data output port for outputting selected pixel data;

at least one multiplexer having a multiplexer output connected to said output port, an address input, and a plurality of data input channels having addresses, each of the plurality of data input channels being connected to a corresponding bit of said input port, at least one data input channel being coupled to the multiplexer output when the corresponding address of the said at least one data input channel is applied to said address input; at least one programmable address counter corresponding to said at least one multiplexer for generating a sequence of multiplexer data input addresses for input into said multiplexer address input, said counter including a storage device for storing an initial address value, an address increment value and a count value, said initial address value representing the multiplexer data channel that is to be initially coupled to the multiplexer output, said address increment value representing the increment that must be added to a current multiplexer data channel address so as to produce a next multiplexer data channel address, the current multiplexer data channel address initially being determined by the initial address value, said count value representing the number of multiplexer addresses that must be generated by said at least one programmable counter prior to said counter restarting the sequence at said initial address value; and means for changing the initial address, address increment and count values stored in said storage device of said programmable counter.

5. A serializer for converting parallel pixel data into serial pixel data, comprising:

a multi-bit data input port for receiving the parallel pixel data from a video memory, the parallel pixel data being defined by groups of bits wherein each pixel is represented by at least one of said group of bits;

a multi-bit data output port for outputting selected data from at least one of said groups of bits;

at least one multiplexer having a multiplexer output connected to said output port, an address input, and a plurality of groups of data input channels, each group of data input channels having an address, each group of data input channels being connected to a corresponding group of bits of said input port, one of said groups of data input channels being coupled to the multiplexer output when the corresponding address of said one of said groups of data input channels is applied to said address input;

at least one programmable address counter corresponding to said at least one multiplexer for generating a sequence of multiplexer data input addresses for input into said multiplexer address input, said counter including a storage device for storing an initial address value, an address increment value and a count value, said initial address value representing the group of multiplexer data input channels initially coupled to the multiplexer output, said address increment value representing the increment that must be added to a current address so as to produce a next address, the current address initially being determined by the initial address value, said count value representing the number of addresses that must be generated by said at least one programmable counter prior to said counter restarting the sequence of said initial address value; and means for changing the initial address, address increment and count values stored in said storage device of said programmable counter.

* * * * *

UNITED STATES PATENT AND TRADEMARK OFFICE
CERTIFICATE OF CORRECTION

PATENT NO. : 5,689,731
DATED : November 18, 1997
INVENTOR(S) : West et al.

It is certified that error appears in the above-identified patent and that said Letters Patent is hereby corrected as shown below:

In column 3, line 29, after "present", please add - - invention - - .

In column 4, line 55, please delete "-".

In column 10, line 14, please delete "o" and substitute therefor - - O - - .

In column 10, line 58, please delete " F F" and substitute therefor

- - E F - - .

Signed and Sealed this

Twenty-eighth Day of April, 1998

Attest:

BRUCE LEHMAN

*Attesting Officer*

*Commissioner of Patents and Trademarks*